Aug. 9, 1927.
A. CRAIG
1,638,185
COVER WRENCH AND CAN OPENER
Filed Dec. 13. 1926
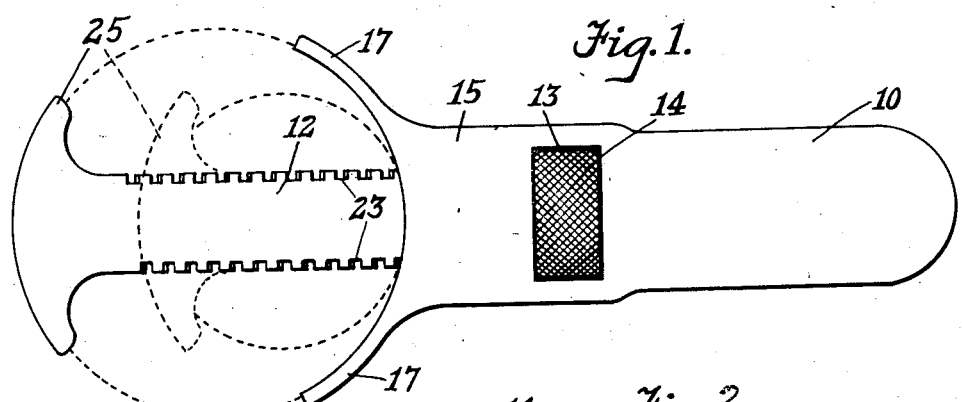
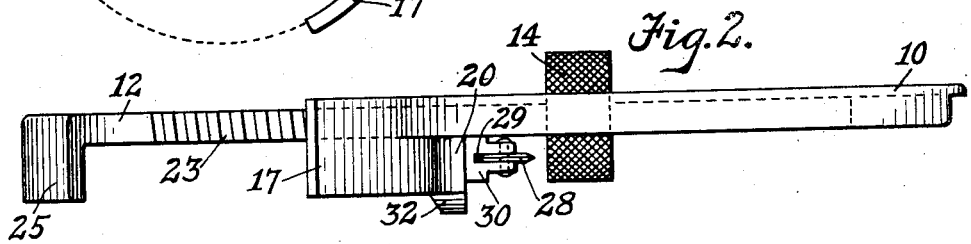
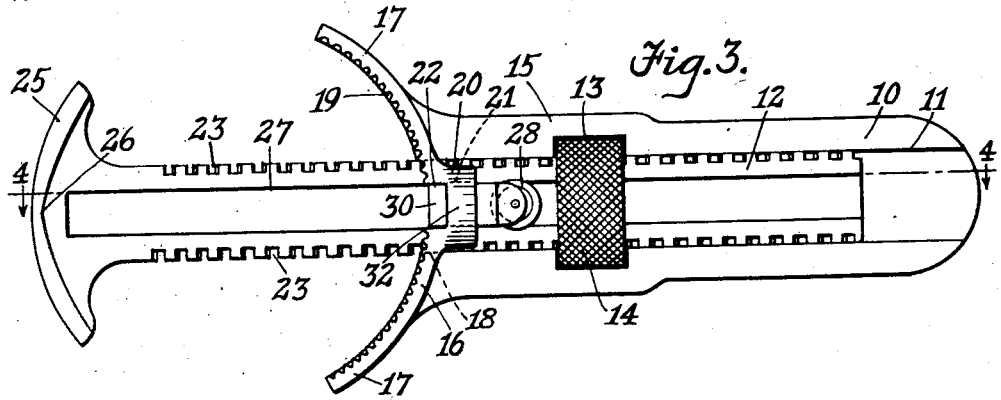
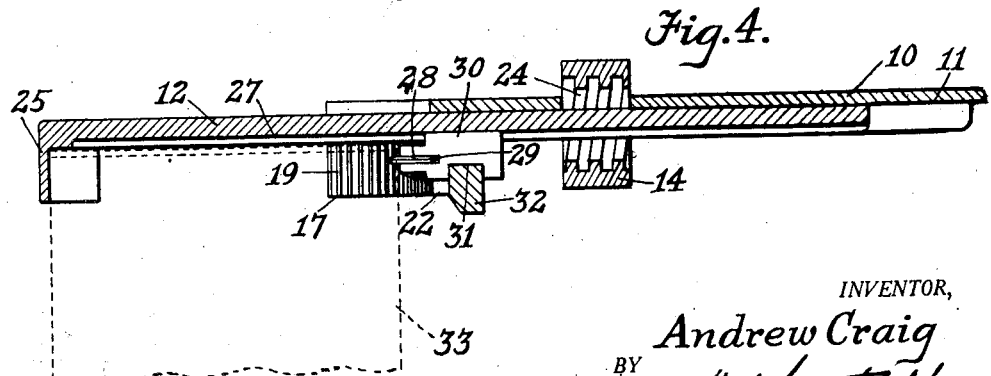
INVENTOR,
Andrew Craig
BY
ATTORNEY.

Patented Aug. 9, 1927.

1,638,185

UNITED STATES PATENT OFFICE.

ANDREW CRAIG, OF LOS ANGELES, CALIFORNIA.

COVER WRENCH AND CAN OPENER.

Application filed December 13, 1926. Serial No. 154,409.

My invention relates to kitchen utensils and more particularly to a utensil for loosening and tightening the covers of screw-top jars and for opening tin cans.

The primary object of my invention is to provide a convenient kitchen utensil which may be used on preserve jars of the screw-top variety to tighten or loosen the tops or covers thereof, and may also be used to open tin cans of the type generally employed for canning and preserving fruits and vegetables.

A further object is to provide a cover-wrench and can-opener of the character described which is readily adjustable for use on jars and cans of widely different sizes and which is strong, durable, and efficient.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof,—

Fig. 1 is a plan view of my adjustable cover-wrench and can-opener showing the upper side thereof;

Fig. 2 is an edge view of the cover-wrench and can-opener shown in Fig. 1;

Fig. 3 is a view, similar to Fig. 1, showing the under side of the cover-wrench and can-opener; and Fig. 4 is a longitudinal sectional view of my cover-wrench and can-opener, taken on line 4—4 of Fig. 3.

As indicated by the reference numerals in the various figures, the cover-wrench and can-opener consists of a handle part 10 having a longitudinal groove 11 in its under side, in which a slide-bar 12 is loosely mounted, and a transverse slot 13 in which a nurled nut 14 is adapted to turn. The forward end 15 of the handle part is widened somewhat and is equipped with an arcuate flange 16 on its under side, which is extended to form lateral jaws 17 made integral with the handle part. A slot 18 adapted to receive slide-bar 12 so that it may move freely therein is cut through the middle part of flange 16 so as to coincide with groove 11. The concave face of flange 16 below slot 18 is serrated as shown at 19. A rearwardly projecting boss 20 is formed on flange 16 and a relatively narrow slot 21, communicating with slot 18, is cut through the boss, flange 16 having a notch 22 cut therethrough which coincides in width with slot 21.

The edges of slide-bar 12 are notched as at 23 to engage the threads 24 of nut 14 as it is turned to shift slide-bar 12 longitudinally in groove 11. The free end of slide-bar 12 is equipped with an arcuate flange 25 complementary to flange 16 on handle part 10 and the middle part of flange 25 is cut away somewhat as at 26 to form an obtuse angle for gripping covers of various sizes. A shallow longitudinal groove 27, whose width corresponds to that of slot 21, is formed in the under side of slide-bar 12.

The can-opener part of my device consists of a sharp-edged disk 28 which is pivotally mounted in a slot 29 in one end of a small block 30. The width of block 30 is slightly less than that of groove 27 and a notch 31 is made in the middle of its under side so that it will fit in slot 21 and groove 27 and will be held by the bridge part 32 of boss 20 from shifting longitudinally therein, as is clearly shown in Fig. 4. Block 30 is reversible endwise and may be placed either in the position shown in Figs 2 and 3 or in the position shown in Fig. 4.

When the device is to be used as a cover-wrench block 30 is placed as shown in Figs. 2 and 3 so that it does not project beyond the serrated surface 19 of flange 16. Thus arranged the device may be placed on a jar cover with flanges 16 and 25 on opposite sides thereof so that it will be clamped between said flanges 16 and 25 when nut 14 is turned forwardly. The cover may then be turned in either a tightening or a loosening direction as desired by turning handle 10 in the corresponding direction. The device may be adjusted for relatively large covers or for relatively small covers as indicated by dotted lines in Fig. 1.

When the device is to be used as a can opener slide-bar 12 is withdrawn from slot 18 and block 30 is removed from slot 21, turned end for end and replaced therein, as shown in Fig. 4; whereupon slide-bar 12 is re-inserted in slot 18 thus holding disk 28 in a cutting position. The device is then placed on the upper end of a can 33, as shown in Fig. 4, in the same position as when used as a wrench, nut 14 is turned forward until disk 28 cuts through the side of the can and handle 10 is swung around until the top end of the can is cut completely off, leaving a uniformly smooth and clean-cut edge on the can.

Having thus illustrated and described my invention, I claim:

1. A cover-wrench and can-opener comprising a handle part having a longitudinal groove in one side thereof and a transverse slot adapted to receive a nut therein; an arcuate flange on one end of said handle part in spaced relation to said transverse slot, said flange having a slot coinciding with said longitudinal groove; a slide-bar working through said flange slot and in said longitudinal groove; a complementary flange on the free end of said slide-bar, said complementary flange being adapted to cooperate with said arcuate flange to grip a jar cover; a nut, turnable on said slide-bar and in said transverse slot, whereby said complementary flange may be caused to approach or to recede from said arcuate flange, and a cutting member adjustably fixed in said handle part to serve as a can-opener.

2. A cover-wrench and can-opener comprising a handle part having a longitudinal groove in one side thereof and a transverse slot adapted to receive a nut therein; an arcuate flange on one end of said handle part in spaced relation to said transverse slot; said flange having a slot coinciding with said longitudinal groove; a slide-bar working through said flange slot and in said longitudinal groove; a complementary flange on the free end of said slide-bar, said complementary flange being adapted to co-operate with said arcuate flange to grip a jar cover; a nut, turnable on said slide-bar and in said transverse slot, whereby said complementary flange may be caused to approach or to recede from said arcuate flange; a boss formed on said arcuate flange, and a cutter disk adjustably fixed in said boss to serve as a can-opener.

3. A combined can-opener and cover-wrench for use on cans and screw-top preserve jars, comprising a handle with an arcuate flange on one end thereof; a slide-bar loosely mounted in a longitudinal groove in said handle, said slide-bar having notched edges to engage the threads of a nut; a complementary flange on the free end of said slide-bar, adapted to grip a jar cover cooperatively with the arcuate flange of said handle; a nut, turnable on said slide-bar and in a transverse slot in said handle, whereby the space between said arcuate flange and said complementary flange may be varied to grip jar covers of various sizes, and a cutter disk adjustably fixed in said handle so as to serve as a can-opener.

ANDREW CRAIG.